July 7, 1953  T. F. HUMPHREYS  2,644,581
FLOUR SIFTER
Filed Dec. 31, 1948  3 Sheets-Sheet 1
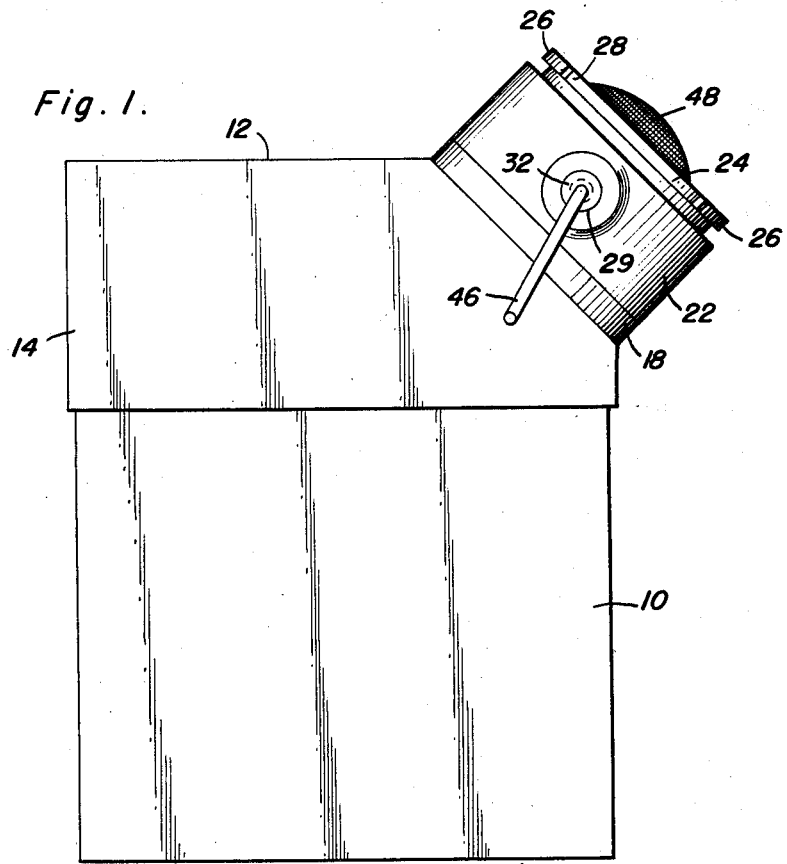
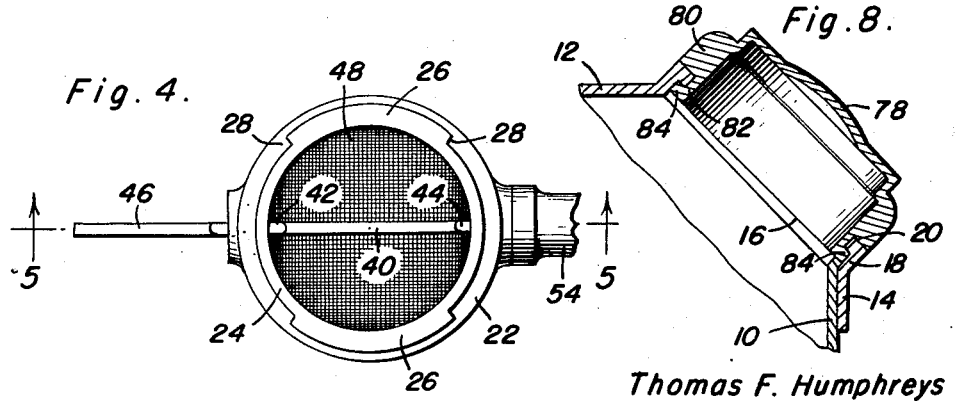
Thomas F. Humphreys
INVENTOR.
BY *Clarence A. O'Brien*
*and Harvey B. Jackson*
Attorneys

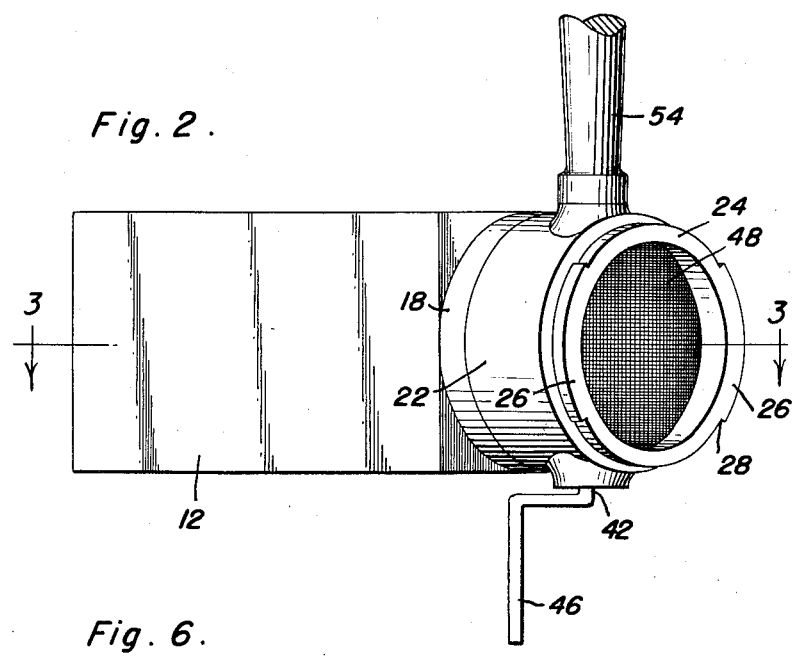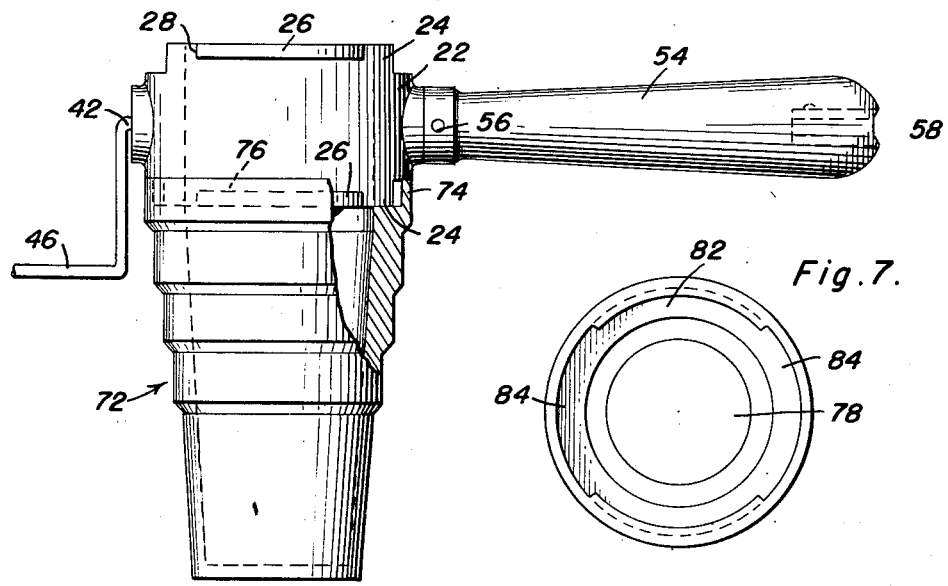

July 7, 1953  T. F. HUMPHREYS  2,644,581
FLOUR SIFTER
Filed Dec. 31, 1948  3 Sheets-Sheet 3
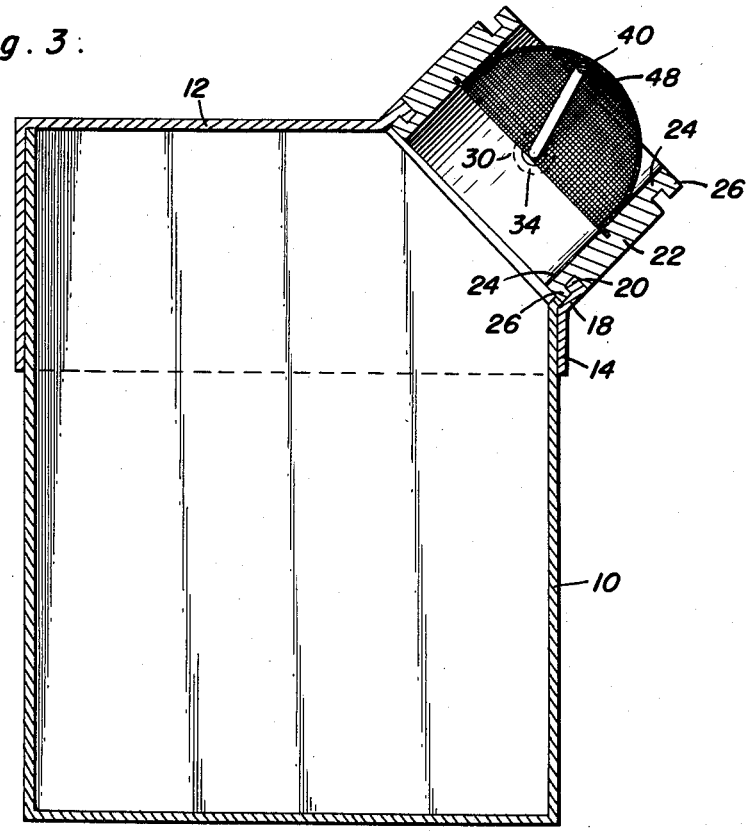
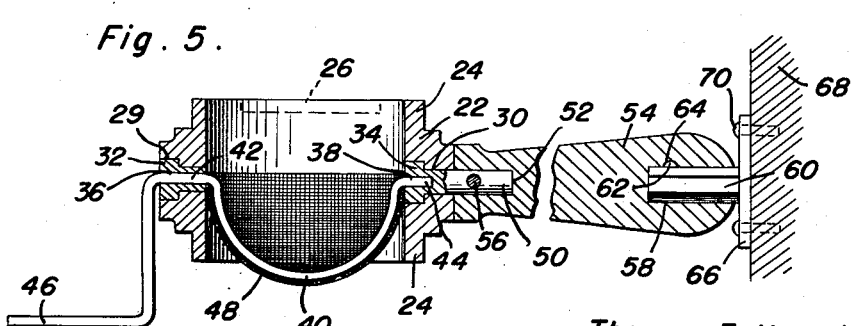
Thomas F. Humphreys
INVENTOR.
BY *Clarence A. O'Brien
and Harvey B. Jacobson*
Attorneys Patented July 7, 1953

2,644,581

UNITED STATES PATENT OFFICE 2,644,581

FLOUR SIFTER

Thomas F. Humphreys, Joliet, Ill.

Application December 31, 1948, Serial No. 68,508

1 Claim. (Cl. 209—240)

This invention relates to new and useful improvements in flour sifting devices and the primary object of the present invention is to provide a device for sifting flour or the like back and forth between a pair of containers for permitting several sifting operations in order to provide a material of a predetermined size.

Another important object of the present invention is to provide a flour sifter including a container having a removable top, a sifting element mounted on the top, and embodying novel and improved means for detachably supporting the element and container relative to a supporting structure such as a wall or the like.

A further feature of the present invention is to provide a flour sifter including a container having a removable top, a sifting element and novel and improved means for detachably securing the sifting element relative to the top.

A further object of the present invention is to provide a sifter including a plurality of interchangeable parts that will permit flour to be sifted in a clean and sanitary manner without the operator having to handle the flour or material being sifted.

A further aim of the present invention is to provide a device for sifting powdered, pulverized or granulated material that is simple and practical in construction, strong and reliable in use, neat and attractive in appearance, small and compact in structure, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the container used in conjunction with the present invention and showing the sifting sleeve applied thereto;

Figure 2 is a top plan view of Figure 1;

Figure 3 is a longitudinal vertical sectional view taken substantially on the plane of section line 3—3 of Figure 2;

Figure 4 is a plan view of the sifter sleeve used in conjunction with the present invention;

Figure 5 is a longitudinal vertical sectional view taken substantially on the plane of section line 5—5 of Figure 4, and showing the wall anchoring means in elevation applied to the handle;

Figure 6 is a side elevational view showing the sifter sleeve attached to a measuring cup and with parts of the cup broken away for the convenience of explanation;

Figure 7 is a plan view of the closure cap used in conjunction with the present invention; and Figure 8 is a fragmentary vertical sectional view of the container and showing the closure cap applied thereto.

Referring now to the drawings in detail, wherein for the purpose of illustration, there is disclosed a preferred embodiment of the present invention, the numeral 10 represents an elongated hollow body or receptacle of any suitable material, such as pasteboard, metal, or plastic, having an upper open end that is provided with a removable cover or lid 12. This lid 12 is provided with a flanged portion 14 that embraces the body 10 and which is frictionally fitted to the body 10.

One corner of the lid 12 is removed and an annular delivery opening 16 provided therein. Fixed to or forming an integral part of the lid 12, is an annular rib or rim 18 that projects outwardly from the edges defining the delivery opening 16. This rib 18 is provided with a pair of diametrically opposed, inturned arcuate flanges or flanged portions 20 for a purpose which will later be more fully described.

The numeral 22 represents an open ended cylindrical member or sifting sleeve that is used in conjunction with the present invention, and which includes a pair of reduced end portions 24 having outwardly projecting, diametrically opposed, arcuate lugs or flanged portions 26 and spaces 28 between the ends of the flanged portions 26 that receive the flanged portions 20 of the rib 18. By then turning the sleeve 22 relative to the rib 18, the flanged portions 20 will be frictionally locked against and above the flanged portions 26 at one end of the sleeve 22.

The central portion of the sleeve 22 is provided with a first countersunken recess 29 in its outer periphery that opposes a second countersunken recess 30 provided in the inner periphery of the sleeve and at a diametrically opposite portion thereof from the recess 29.

Headed bearing pins 32 and 34 are frictionally fitted in the recesses 29 and 30 and the pin 32 is provided with an axial bore 36 whereas the pin 34 is formed with a recess 38.

An arcuate agitator or beater 40 is mounted for rotation in the sleeve 22 and includes end portions 42 and 44 that are received in the bore 36 and recess 38 for rotation. The end portions 42 are provided with an outwardly extending crank handle or angular extension 46 forming a finger-receiving means for rotating the agitator.

A concavo-convexed grid member or screen unit 48 is suitably fixed in the sleeve and projects partially from one end of the sleeve. This unit 48 conforms to the shape of the agitator and is spaced slightly from the agitator to permit unrestricted rotation of the agitator.

The bearing pin 34 is provided with an integral extension 50 that is received in a recess 52 at one end of a hand-grip or support arm 54 and a locking pin 56 frictionally fitted in a transverse bore provided in the handle 54, and intersecting recess 52, enters a transverse bore provided in the extension 50 to retain the hand-grip 54 normally attached to the sleeve 22.

Obviously, any suitable means could be utilized in order to detachably secure the hand-grip relative to the extension 50 such as a fastener or set screw.

The free end of the hand-grip 54 is provided with a multi-sided socket or recess 58 that receives a multi-sided attaching arm or lug 60 and a protuberance or projection 62 on the lug 60 is frictionally fitted in a recess 64 provided in the wall of the socket 58 to hold the lug 60 relative to the hand-grip 54. The lug 60 is suitably fixed to an anchoring plate 66 that is suitably secured to a supporting structural element, such as a wall or the like 68, by fasteners 70.

The numeral 72 represents the measuring cup or container that is used in conjunction with the present invention generally, and which includes an upstanding annular wall 74 at its open upper end on the outer face of which there projects a pair of diametrically opposed, arcuate flanged portions or lugs 76 having spaces therebetween that will receive the flanged portions 26 at one end of the sleeve 22. When the sleeve is rotated with respect to the container 72, or vice versa, the flanged portion 76 will be frictionally fitted against and above the flanged portions 26, as shown in Figure 6, to lockably retain the sifting sleeve 22 relative to the container 72.

The delivery opening in the lid 12 is normally closed by a closure cap 78 having an annular flange portion 80 from which there projects a reduced neck 82 having its outer periphery disposed inwardly from the outer periphery of the flange portion 80. A pair of diametrically opposed arcuate flanged portions or lugs 84 project from the outer periphery of the neck 82 and spaces are provided between the flange portions 84 to accommodate the flanged portions 20 of the rim 18, so that by turning the cap 78 relative to the top 12, the flanged portions 20 will be frictionally locked against and above the flanged portions 84, with the outer periphery of the rim 18 flush with the outer periphery of the flange portion 80.

In practical use of the present invention, the cap 78 is first removed from the top and one end of the sleeve 22 is locked with the rim 18, with the flanged portions 20 frictionally locked against and above the flanged portions 26 at one end of the sleeve 22. The receptacle 72 is then locked with the free outer end of the sleeve 22, as previously described, with the flanged portions 26 bearing against the flanged portion 76.

The container 10 is then inverted or tilted so that flour therein may pass into the sleeve 22 and by rotating the agitator 40 the material in the sleeve will be forced into the receptacle or container 72.

The sleeve 22 is then removed from the rim 18 and a further container, similar to the container 72, is lockably secured to the then free end of the sleeve 22 and by rotating the agitator 40, a second sifting action is accomplished. This process may be repeated any suitable number of times until the flour, or other such material that is being sifted, has been sifted to the predetermined and desired size.

During the sifting operations it becomes tedious for an operator to hold the containers through the medium of the hand-grip 54, therefore, the said hand-grip or arm 54 is applied to the lug 60, in a manner previously described, so that the user does not have to support the container and assembled parts and merely has to rotate the agitator.

Obviously, many suitable means could be utilized for actuating the agitator, such as a motor, gear means or pulley means without deviating from the scope of the present invention. However, since the instant structure is intended to provide a small and compact article that is extremely inexpensive to manufacture, the simplest form of operating means has been illustrated and, therefore, the agitator is manually operated.

A particular shape has been illustrated for the receptacle 10 and lid 12. However, it should be noted that any suitable shape could be utilized without deviating from the scope of the present invention and that the opening provided in the lid could be formed in the upper wall thereof without effecting the efficiency of the instant structure appreciably.

A single recess 64 has been illustrated for receiving the protuberance 62 although any suitable number of these recesses could be utilized in order to retain the sleeve 22 in a selected rotated position relative to a supporting structural element if such is found desirable.

It is further noted that the elements utilized in conjunction with the present invention may be of a transparent material in order that the user may observe the amount of material being sifted from one container into another container.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A flour sifting device comprising a main container having a removable top to permit flour to be inserted into the container, said top having a corner wall within an opening therein, a sleeve secured to said corner wall in registry with the opening, a screen in the sleeve, a beater within the sleeve for beating flour through the screen, and an auxiliary container having an open end and a flat closed end opposite said open end, said open end being removably secured to the sleeve, said corner wall being disposed at an angle of substantially forty-five degrees with respect to said main container so that all the contents of the main container may be sifted therefrom when the auxiliary container is supported on said flat closed end on a horizontal surface with the main container disposed over the auxiliary container.

THOMAS F. HUMPHREYS.

References Cited in the file of this patent

UNITED STATES PATENTS

| Number | Name | Date |
|---|---|---|
| 183,890 | Block | Oct. 31, 1876 |
| 305,218 | Quinby | Sept. 16, 1884 |
| 345,139 | Hovey | July 6, 1886 |
| 448,673 | Reynolds | Mar. 24, 1891 |
| 643,628 | Brumback | Feb. 20, 1900 |
| 1,149,909 | Green | Aug. 10, 1915 |
| 1,461,567 | Wheeler | July 10, 1923 |
| 1,565,081 | Frazier | Dec. 8, 1925 |
| 1,806,159 | Goldberg | May 19, 1931 |
| 1,922,174 | Pidgeon | Aug. 15, 1933 |
| 2,213,719 | Repath et al. | Sept. 3, 1940 |
| 2,318,812 | Spilo | May 11, 1943 |
| 2,393,453 | Bailey | Jan. 22, 1946 |
| 2,416,810 | Bailey | Mar. 4, 1947 |
| 2,500,059 | Burnham | Mar. 7, 1950 |